United States Patent
Nalawade et al.

(10) Patent No.: US 7,773,610 B2
(45) Date of Patent: Aug. 10, 2010

(54) QOS AND FAULT ISOLATION IN BGP TRAFFIC, ADDRESS FAMILIES AND ROUTING TOPOLOGIES

(75) Inventors: Gargi Nalawade, San Jose, CA (US); Martin Djernaes, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 1797 days.

(21) Appl. No.: 10/884,463

(22) Filed: Jul. 1, 2004

(65) Prior Publication Data

US 2006/0002402 A1 Jan. 5, 2006

(51) Int. Cl.
H04L 12/28 (2006.01)
(52) U.S. Cl. ..................... 370/401; 709/231
(58) Field of Classification Search .............. 370/218, 370/331, 401, 446, 229, 238, 352, 407, 395.52
See application file for complete search history.

(56) References Cited

U.S. PATENT DOCUMENTS

| | | | |
|---|---|---|---|
| 6,385,204 B1 * | 5/2002 | Hoefelmeyer et al. | 370/401 |
| 6,768,726 B2 * | 7/2004 | Dorenbosch et al. | 370/331 |
| 6,850,503 B2 * | 2/2005 | Dorenbosch et al. | 370/331 |
| 6,920,144 B2 * | 7/2005 | Niermann | 370/401 |
| 6,963,575 B1 * | 11/2005 | Sistanizadeh et al. | 370/404 |
| 7,006,433 B1 * | 2/2006 | Dantu et al. | 370/218 |
| 7,111,035 B2 * | 9/2006 | McClellan et al. | 709/201 |
| 7,136,374 B1 * | 11/2006 | Kompella | 370/352 |
| 7,139,242 B2 * | 11/2006 | Bays | 370/238 |
| 7,164,693 B2 * | 1/2007 | Turina et al. | 370/467 |
| 2002/0057651 A1 | 5/2002 | Roberts | |
| 2002/0131427 A1 * | 9/2002 | Niermann | 370/401 |
| 2002/0163884 A1 * | 11/2002 | Peles et al. | 370/229 |
| 2002/0165981 A1 | 11/2002 | Baturk et al. | |
| 2004/0052257 A1 * | 3/2004 | Abdo et al. | 370/392 |
| 2005/0068968 A1 * | 3/2005 | Ovadia et al. | 370/396 |
| 2006/0109376 A1 * | 5/2006 | Chaffee et al. | 348/423.1 |
| 2008/0056142 A1 * | 3/2008 | Arnold et al. | 370/248 |

OTHER PUBLICATIONS

Cisco Systems, "Cisco IOS Software Releases 12.0 S," Cisco Systems Inc., Retrieved from the internet at <http://www.cisco.com/en/US/products/sw/iosswrel/ps1829/products_feature_guide09186a0080087c60.html>, retrieved on May 20, 2004, 7 pages.

(Continued)

Primary Examiner—William Trost, IV
Assistant Examiner—Emmanuel Maglo
(74) Attorney, Agent, or Firm—Hickman Palermo Truong & Becker LLP (57) ABSTRACT

A method is disclosed for routing BGP traffic. In one embodiment, according to the method, an association is formed between a first process and a second process. The first process includes a first BGP process on a first peer and the second process includes a second BGP process on a second peer. The association is formed using a reliable datagram-oriented IP transport protocol. Traffic sent from the first BGP process is segregated into a control traffic type and an update traffic type and any more finer classifications that can further classify BGP traffic. The traffic from the first BGP process is sent to the second BGP process in accordance with a priority allocation assigned to the traffic types based on the association.

44 Claims, 9 Drawing Sheets

OTHER PUBLICATIONS

Cisco Systems, "Border Gateway Protocol (BGP)," retrieved from the internet at <http://www.cisco.com/univercd/cc/td/doc/cisintwk/ito_doc/bgp.htm>, retrieved on May 20, 2004, 9 pages.

Jacobson, Van et al., "BST," Packet Design, 2005, retrieved from <http://www.packetdesign.com/technology/bst.htm>, 3 pages (including abstract).

Ong, L. et al., "An Introduction to the Stream Control Transmission Protocol (SCTP)," Network Working Group, Request for Comments: 3286, May 2002, retrieved from the internet at <http://www.ietf.org/rfc/rfc3286.txt>, retrieved in May 20, 2004, 10 pages.

Poduri, Kedar, "BST-BGP Scalable Transport," NANOG 27, Phoenix, AZ. Feb. 9, 2003, 15 pages.

International Searching Authority, "Notification of Transmittal of the International Search and the Written Opinion of the International Searching Authority, or the Declaration," PCT/US05/22103, dated Apr. 20, 2006, 10 pages.

Current Claims, PCT/US05/22103, 5 pages.

* cited by examiner

QOS AND FAULT ISOLATION IN BGP TRAFFIC, ADDRESS FAMILIES AND ROUTING TOPOLOGIES

FIELD OF THE INVENTION

The present invention generally relates to routing specific types of network traffic. The invention relates more specifically to a technique for providing Quality of Service (QoS) and fault-isolation in Border Gateway Protocol (BGP) traffic, address families and routing topologies.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

It is desirable to prioritize and segregate or isolate network traffic in routers and routing systems. Certain types of control traffic, such as BGP, however, do not lend themselves to prioritization and segregation or isolation using conventional methods. (BGP is a protocol used by routers and other route entities to exchange routing information about each router's respective networks or routing routes.) This is due to the nature of the traffic, the quantities of information sent and the timing of the sending of the information. In the case of BGP, for example, large amounts of data may be transmitted in reasonably short periods of time, giving BGP a "bursty" nature. This is especially true during periods of so named "convergence." As used herein, the term "convergence" refers to that time in which churn or change occurs in a network, which requires updating of routing information in the routing entities of the network.

In the case of BGP, traffic can be loosely classified into two categories: 1) BGP update traffic; and 2) BGP control traffic. The first category includes the bulk of BGP traffic and comprises updates to routing information for the routing entities in a network. The latter classification of traffic includes messages, such as BGP keepalives, BGP route-refreshes, BGP opens, BGP notifications, BGP soft-notification messages and the like. Typically, the volume of BGP control traffic is relatively small compared to the volume of BGP update traffic. Accordingly, it would seem that BGP could benefit from some form of prioritization and segregation.

However, because of BGP's bursty nature, and because BGP is typically implemented using TCP, conventional prioritization and segregation schemes often fail. Prioritization and/or segregation of a TCP stream is not easily accomplished and conventional approaches do not provide full prioritization. For example, in many conventional approaches, if any other traffic is being transmitted in the same TCP session, the receiving, or remote, side will still wait for previously transmitted message segments to be received before the remote side passes any prioritized message segments to an application residing on the remote side.

Based on the foregoing, there is a clear need for a mechanism for prioritizing and sending control traffic, such as BGP traffic, between routers and other routing entities.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for providing QoS and fault isolation in BGP traffic, address families and routing topologies is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Method of Routing BGP Traffic |
| 3.1 | Overview |
| 3.2 | Process of Routing BGP Traffic |
| 3.3 | Process of Managing BGP Traffic |
| 3.4 | Process of Providing QoS in BGP Traffic |
| 3.5 | Process of Providing Routing Topologies in BGP Traffic |
| 4.0 | Implementation Mechanisms-Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for routing BGP traffic. In one embodiment, according to the method, an association is formed between a first process and a second process. The first process includes a first BGP process and the second process includes a second BGP process. The first BGP process and the second BGP process reside on a first peer and a second peer of peered machines. The association is formed using a reliable datagram-oriented IP transport protocol. Traffic sent from the first BGP process is segregated into a control traffic type and an update traffic type. The traffic from the first BGP process is sent to the second BGP process in accordance with a priority allocation assigned to the traffic types based on the association.

In one embodiment, a first priority is assigned to packets containing control traffic type information and a second priority is assigned to packets containing update traffic type information. Communication of traffic having a first priority is managed so that a delay for control traffic sent to the second process is sufficiently small to prevent the second BGP process from failing for lack of control information from the first BGP application. In one embodiment, traffic from the first process is segregated by traffic type by determining an IP type of service identifier of the traffic and packaging traffic into common packets based upon the IP type of service identifier.

In one embodiment, the update traffic is segregated into a first communications session and a second communications session according to address family identifiers (AFI). The first communications session and the second communications session are included by the same association. In one embodiment, the update traffic is segregated into a first communications session and a second communications session according to address family identifiers (AFI) and subsequent address family identifiers (SAFI) and optionally any other identifier which can further qualify the contents of the communication stream. In the event of an error occurring with the first communication session for a first AFI, the first communication session may be reset, while the second communications session is maintained undisturbed.

In one embodiment, traffic is sent from the first BGP process to the second BGP process according to the priority allocation assigned to the traffic type by assigning a first priority to packets containing traffic of the first communications session and assigning a second priority to packets containing traffic of the second communications session. In one embodiment, the amount of traffic having the first priority is managed so that traffic of the first communications session is routed in accordance with a target QoS.

In one embodiment, a first routing information is assigned to the first communications session and a second routing information is assigned to the second communications session. This can enable a first application using the first communications session to use a first routing topology and a second application using the second communications session to use a second routing topology. The first routing topology can be different from the second routing topology.

In one embodiment, a Stream Control Transmission Protocol (SCTP) association is formed between the first process and the second process. Embodiments employing SCTP send the traffic from the first BGP process to the second BGP process by assigning a first priority to packets containing control traffic type information and assigning a second priority to packets containing update traffic type information. The traffic assigned the first priority is sent to the second BGP process on a first stream of the association. The traffic assigned the second priority is sent to the second BGP process on a second stream of the association.

In one embodiment, the traffic from the first BGP process is sent to the second BGP process according to a priority allocation assigned to the traffic type using the association by assigning a first priority to packets containing traffic of the first communications session and assigning a second priority to packets containing traffic of the second communications session. The traffic assigned the first priority is sent to the second BGP process on a first stream of the association. The traffic assigned the second priority is sent to the second BGP process on a second stream of the association.

In one embodiment, a Stream Control Transmission Protocol (SCTP) association is formed between a first process and a second process. The first process includes a first BGP process and the second process includes a second BGP process. Traffic sent from the first BGP process is segregated into a control traffic type and an update traffic type. A first priority is assigned to packets containing control traffic type information. A second priority is assigned to packets containing update traffic type information. The traffic assigned the first priority is sent to the second BGP process on a first stream of the association. The traffic assigned the second priority is sent to the second BGP process on a second stream of the association.

In one embodiment, the update traffic is segregated into a first communications session and a second communications session according to address family identifiers (AFI). The first communications session and the second communications session are included by the same association. The second priority is assigned to packets containing update traffic for the first communications session. A third priority is assigned to packets containing update traffic for the second communications session. The traffic assigned the first priority is sent on a first stream of the association and the traffic assigned the second priority is sent on a second stream of the association. The traffic assigned the third priority is sent on a third stream of the association. This can enable the amount of traffic having the first priority, second priority and third priority to be managed so that traffic of at least one communications session is routed in accordance to a target QoS.

In one embodiment, a first routing information is assigned to the first communications session and a second routing information is assigned to the second communications session. This can enable a first application using the first communications session to use a first routing topology and a second application using the second communications session to use a second routing topology. The first routing topology can be different from the second routing topology.

In other aspects, the invention encompasses a computer apparatus and a machine-readable medium configured to carry out the foregoing steps.

2.0 Structural and Functional Overview

Figure 1:
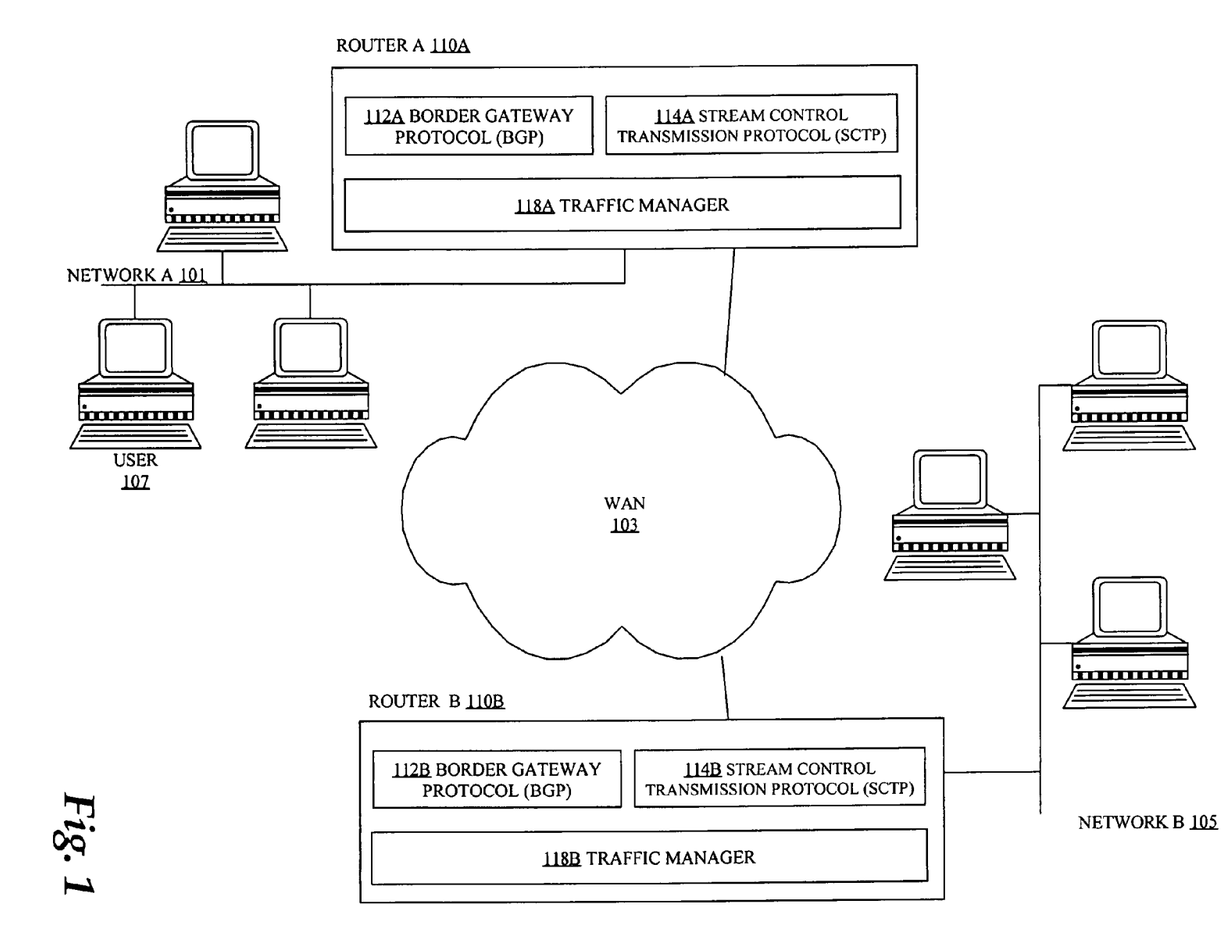
FIG. 1 is a block diagram depicting an example network in which routing of BGP traffic may be implemented in one embodiment of the invention.

FIG. 1 is a block diagram depicting an example network in which routing of BGP traffic in a packet network may be implemented in one embodiment of the invention. While the invention is illustrated generally with reference to an example of peered router devices supporting BGP over SCTP sessions with multiple streams deployed in an IP network environment, the present invention does not require such implementation, and in some embodiments, techniques according to the invention may be implemented using multiple transport sessions and for other protocols and/or in other types of peered devices, such as routers, gateways, wireless access points or various combinations thereof. In various embodiments, techniques for routing traffic can be applied to other protocols having a multi-layered information model and using a transport session, for example, Telephony Routing Information Protocol (TRIP) and the like.

In the example configuration depicted by FIG. 1, router 110A has been installed by an IT administrator of a Network A 101 in order to connect Network A 101 to other networks (not shown in FIG. 1). When the router 110A is installed, it is communicatively coupled to a router 110B through the network 103, which may be any type of communications link, but in one embodiment is a wide area network (WAN). Router 110B connects network B 105 to other networks (not shown in FIG. 1). In the embodiment illustrated by FIG. 1, peered routers 110A and 110B enable devices on network A 101 and on network B 105 to communicate to one another and to other devices (not shown in FIG. 1). Networks 101 and 105 may be any type of network and may be of different types from one another. For example, networks 101 and 105 may be one or more other public networks or one or more private networks in various embodiments. Network 103 may be a wide area network (WAN), or the like. Routers 110A and 110B comprise border gateway protocol 112A, 112B and stream control transmission protocol 114A, 114B, respectively, which may communicate with one another as peers. While the present invention is being illustrated using the example of BGP 112A, 112B sessions between routers 110A and 110B connected back to back over a WAN link (i.e., network 103), the present invention is not limited to this embodiment. Some BGP sessions, called External Border Gateway Protocol (E-BGP)), may be multi-hop sessions, in which one or more intermediary routers (not shown in FIG. 1) route the traffic between one or more intermediary networks (not shown in FIG. 1). Others BGP sessions, called Internal Border Gateway Protocol (I-BGP)), are internal in a single network. Such I-BGP sessions can be either back-to-back connections or multi-hop sessions, but are completely within a single network in various embodiments.

In one embodiment, one or more of routers 110A and 110B (router 110A in FIG. 1) includes a traffic manager 118A for managing the assignment and routing of BGP communications traffic between routers 110A and 110B by processes using streams control transmission protocol 114A, 114B. The traffic manager 118A may be part of an operating system of a router, a process remotely located on a separate platform from router 110A or integrated or partially integrated with another process (not shown). As further shown by FIG. 1, router 110B also may include a traffic manager 118B. The ability to control and prioritize BGP traffic, and other "bursty" natured traffic is provided by one embodiment that will be described in further detail below.

As can be seen from FIG. 1, a communication path may be established from router 110A to router 110B via wide area network 103. In one configuration, border gateway protocol (BGP) 112B listens on an SCTP port for connection requests from peers. (Like TCP, SCTP provides a port interface, however, the BGP process handles the individual streams inside the SCTP association.) Also, BGP 112A initiates connections to the other peers listening on an SCTP port. Whenever a connection is established between two BGP peers by either passive open (i.e., connection opened by router 110A) or active open (i.e., connection opened by router 110B) methods using SCTP, an association formed between router 110A and router 110B. In the next section, techniques for controlling and managing the BGP traffic using the association will be discussed with reference to example embodiments.

3.0 Method of Routing BGP Traffic 3.1 Overview

According to one embodiment, when the BGP 112A is peered with BGP 112B over an association formed using SCTP 112A, 114B, a portion of the BGP process 112A will classify the traffic (e.g. setting control traffic to be network control traffic and updates to be data bulk traffic). The traffic manager 118A assigns different types of traffic to different streams of the SCTP protocol 114A, 114B. This new feature of the present invention enables embodiments to provide routing of BGP traffic based upon a priority. In one embodiment, delivery of BGP control traffic can be performed with sufficiently small delay that recipient BGP processes will not close down for a lack of receiving control traffic from sending BGP peers. In some embodiments, BGP traffic can be managed to provide a QoS target. In some embodiments, techniques can also provide plural routing topologies to processes communicating using different streams.

3.2 Process of Routing BGP Traffic

Figure 2A:
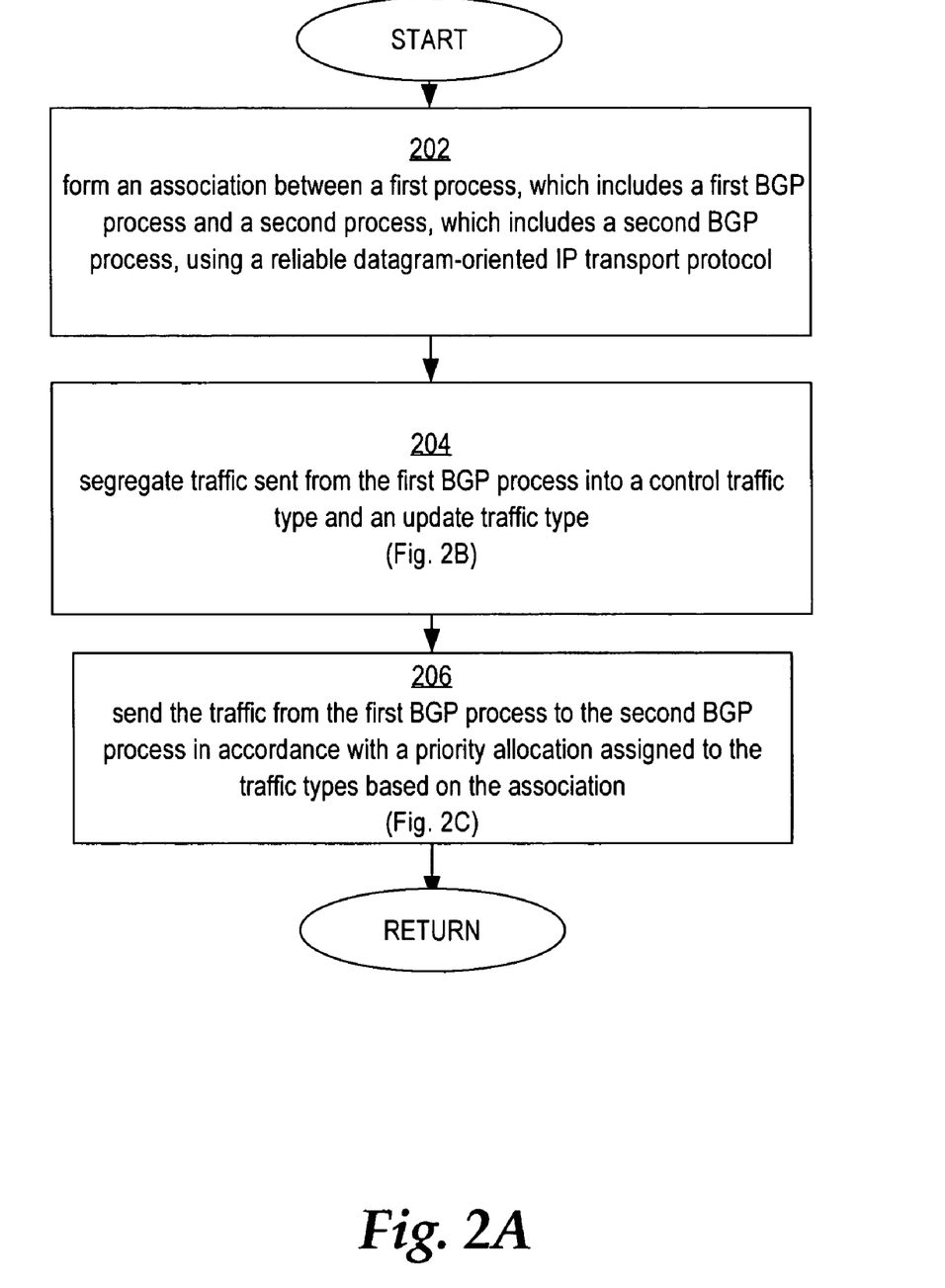
FIG. 2A is a flow diagram that illustrates a high level overview of one embodiment of a method for prioritizing and sending BGP control traffic.

FIG. 2A is a flow diagram that illustrates a high level overview of one embodiment of a method for prioritizing and sending control traffic, such as BGP traffic. In block 202, an association between a first process and a second process is formed, using a reliable datagram-oriented IP transport protocol. In one embodiment, the association is formed using Stream Control Transport Protocol, however, other reliable datagram-oriented IP protocols may be used in other embodiments. The first process includes a first BGP process and the second process includes a second BGP process. In block 204, traffic sent from the first BGP process is segregated into a control traffic type and an update traffic type. Segregating BGP traffic into control and update traffic types is discussed herein below in further detail with reference to FIG. 2B. In block 206, the traffic from the first BGP process is sent to the second BGP process in accordance with a priority allocation assigned to the traffic types based on the association. Sending the BGP traffic according to a priority is discussed herein below in further detail with reference to FIG. 2C.

3.3 Process of Managing BGP Traffic

Figure 2B:
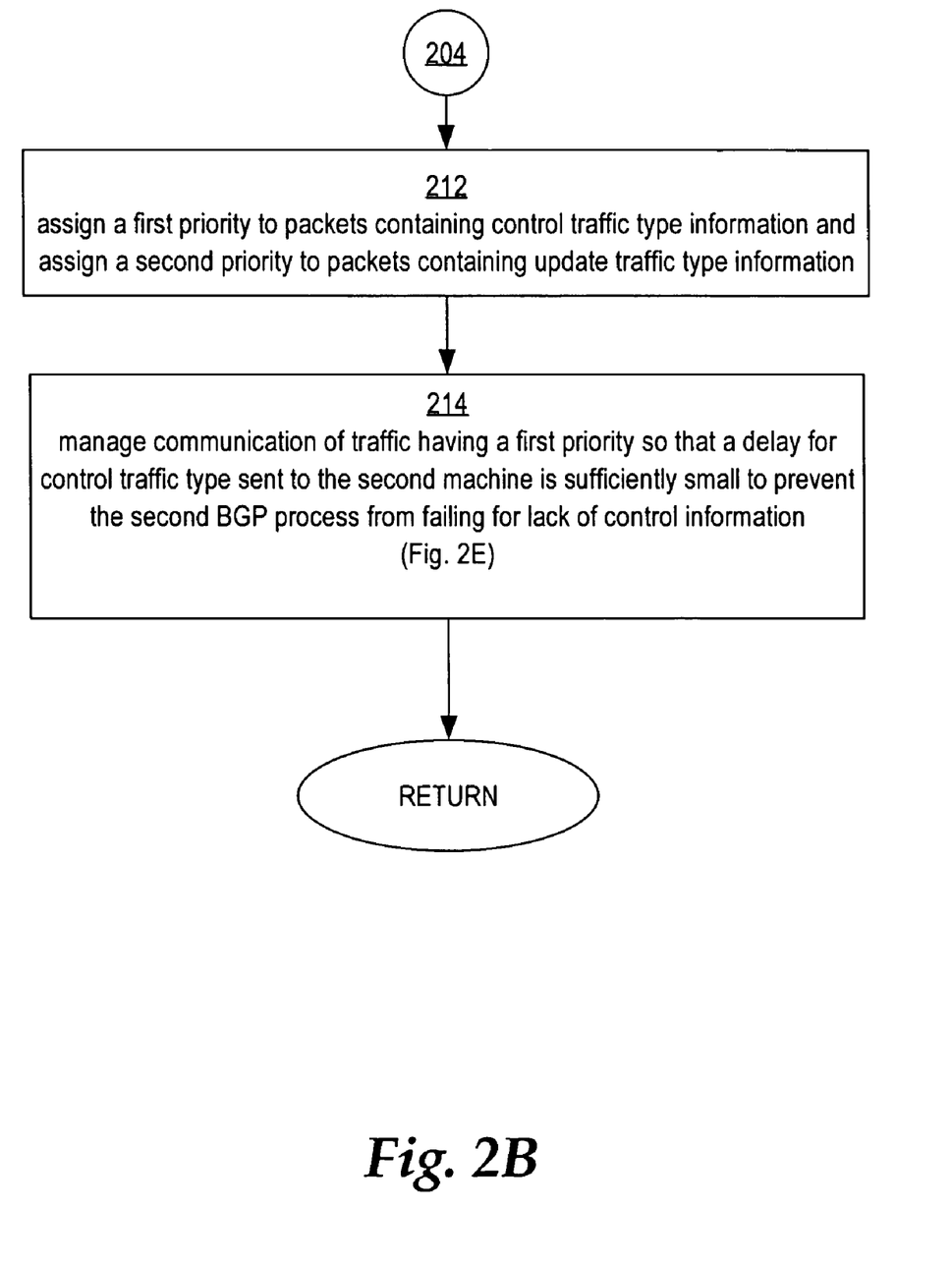
FIG. 2B is a flow diagram that illustrates a high level overview of segregating BGP traffic into control and update traffic types operable with the processing depicted by FIG. 2A in one embodiment.
Figure 2C:
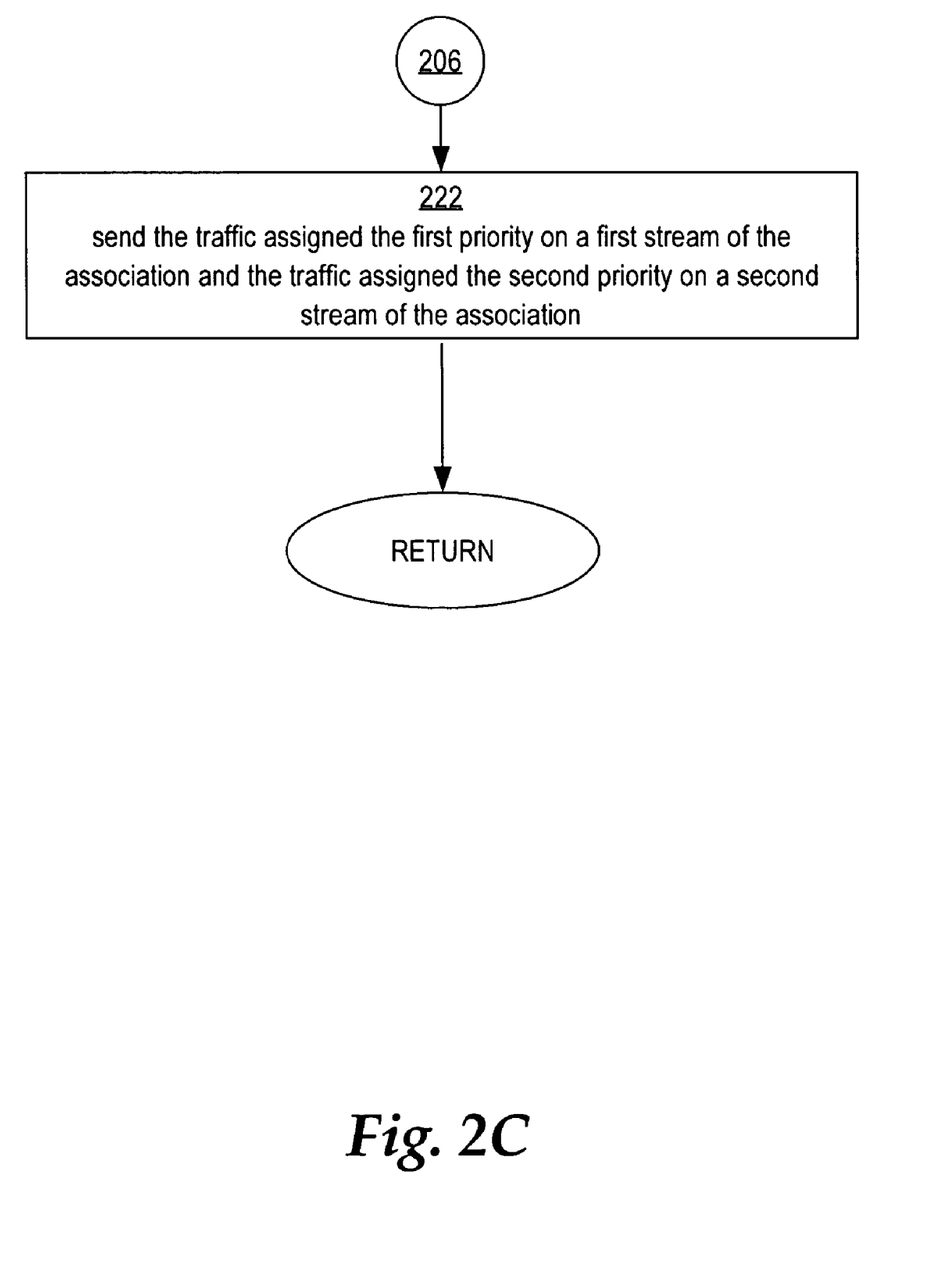
FIG. 2C is a flow diagram that illustrates a high level overview of sending the BGP traffic according to a priority operable with the processing depicted by FIG. 2A in one embodiment.

FIG. 2B is a flow diagram that illustrates a high level overview of segregating BGP traffic into control and update traffic types operable with the processing depicted by FIG. 2A in one embodiment. In block 212, a first priority is assigned to packets containing control traffic type information and a second priority is assigned to packets containing update traffic type information. In one embodiment, traffic associated with the first priority, i.e., control traffic, will be given priority over traffic associated with the second priority, i.e., update traffic. In other words, in such embodiments, control traffic is afforded a higher priority relative to update traffic. In block 214, communication of traffic having a first priority is managed so that a delay for control traffic type sent to the second process is sufficiently small to prevent the second BGP process from failing for lack of control information. Now referring to FIG. 2C, the traffic assigned the first priority is sent on a first stream of the association and the traffic assigned the second priority on a second stream of the association.

In one embodiment, traffic may be managed to provide a quality of service target for one or more types of traffic using technique discussed herein below in further detail with reference to FIG. 2D.

3.4 Process of Providing QoS in BGP Traffic

An approach for providing QoS in BGP traffic for a network is now described with reference to FIG. 3A and FIG. 2E. FIG. 3A is a functional diagram that illustrates operation of SCTP streams in one embodiment; FIG. 2D is a flow diagram that illustrates a high level overview of providing QoS for BGP traffic operable with the processing depicted by FIG. 2A in one embodiment.

Referring to FIG. 3A, assume that routers 110A and 110B have established an SCTP association as indicated by numeral 1. The SCTP association includes a number of individual streams, which are being used by routers 110A and 110B to exchange communications packets. In one embodiment, routers 110A and 110B have segregated traffic into control traffic and update traffic. In FIG. 3A, the control traffic has been assigned a first priority and is sent on a first stream of the association as indicated by numeral 2. The update traffic has been further segregated into two individual groups of traffic based on address family identifiers (AFI) of the traffic. A first group of update traffic, corresponding to a first AFI is sent on a second stream of the association as indicated by numeral 3. A second group of update traffic, corresponding to AFI number two is sent on a third stream of the association as indicated by numeral 4. Alternative embodiments may use different numbers of streams in the association and may segregate the traffic using other mechanisms, such as subsequent address family identifiers (SAFI) or any other more specific identifier that can further classify BGP traffic with a finer/broader granularity. Such segregating of traffic and assignment to streams in an association can enable specific embodiments to provide a QOS level for one more priority communications.

Figure 2D:
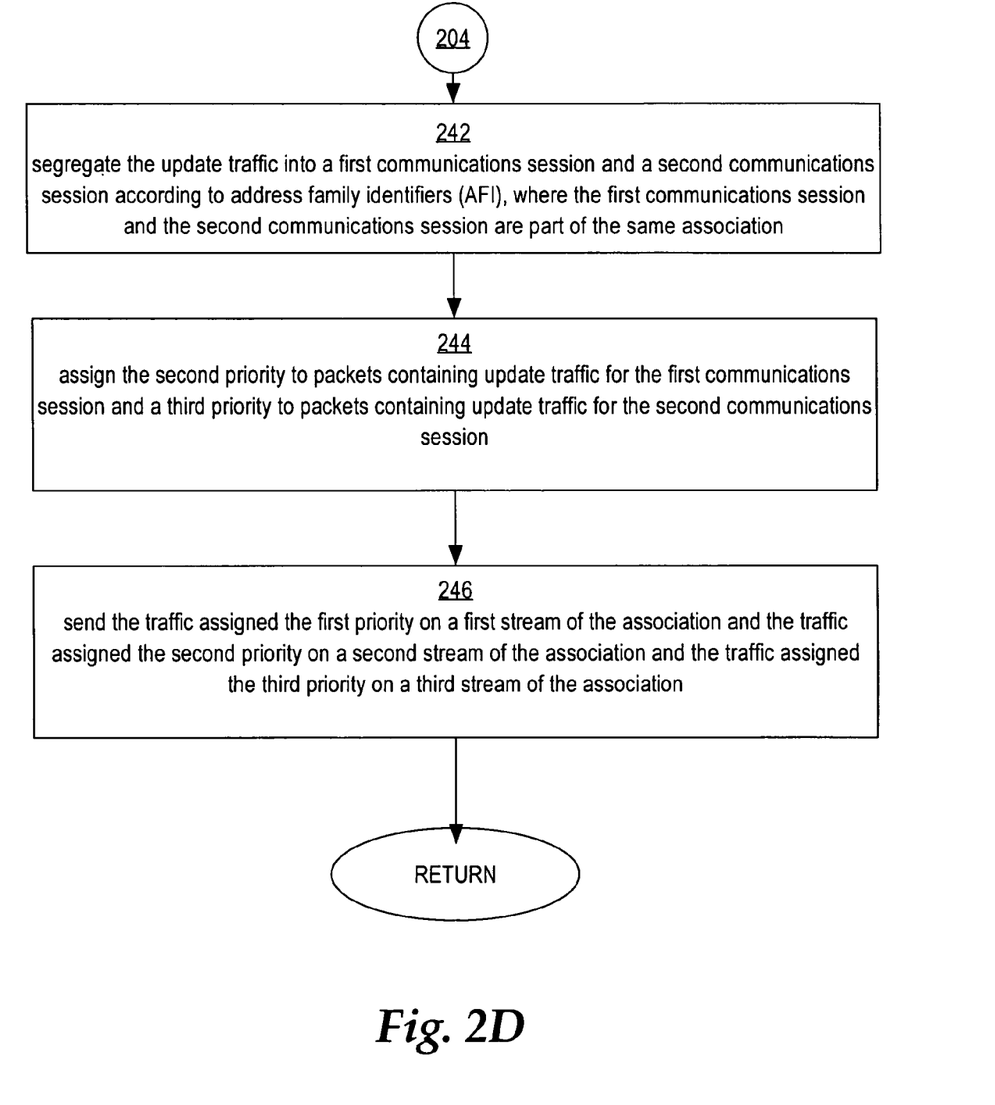
FIG. 2D is a flow diagram that illustrates a high level overview of providing QoS for BGP traffic operable with the processing depicted by FIG. 2A in one embodiment.
Figure 3A:
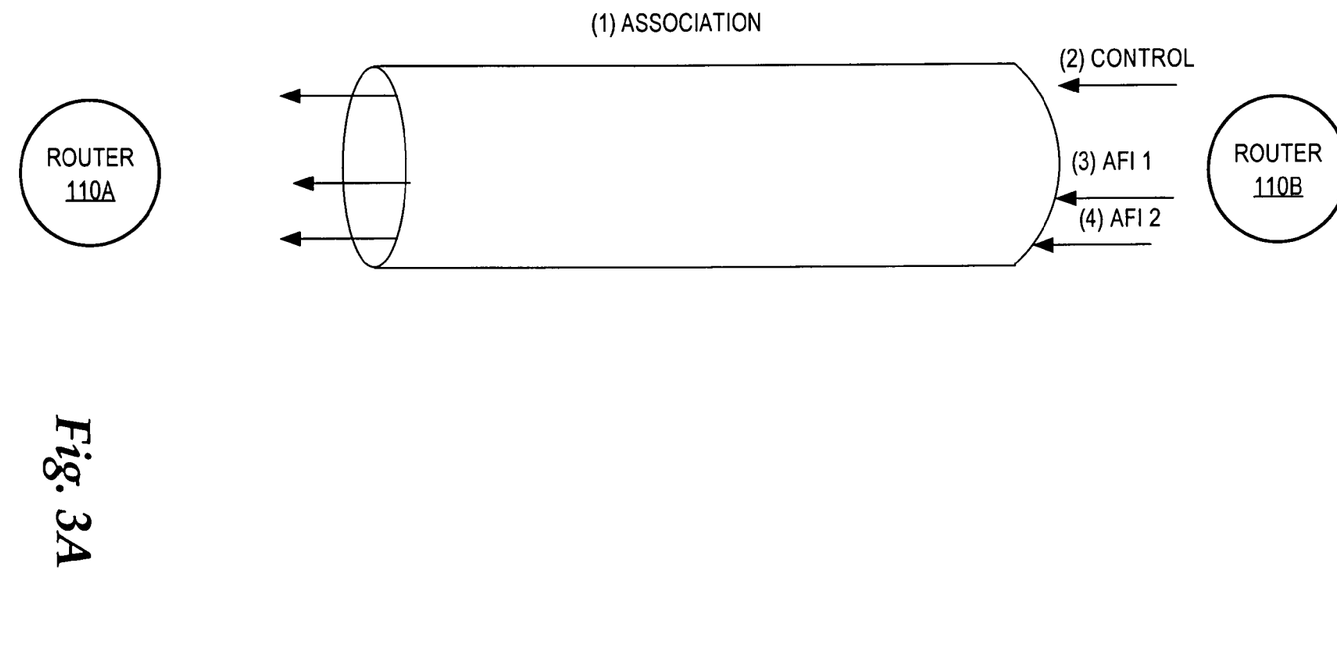
FIG. 3A is a is a functional diagram that illustrates operation of SCTP streams in one embodiment.

Now referring to FIG. 2D, in block 242, the update traffic is segregated into a first communications session and a second communications session according to address family identifiers (AFI), where the first communications session and the second communications session are part of the same association. In block 244, the second priority is assigned to packets containing update traffic for the first communications session and a third priority to packets containing update traffic for the second communications session. In block 246, the traffic assigned the first priority is sent on a first stream of the association. The traffic assigned the second priority is sent on a second stream of the association and the traffic assigned the third priority on a third stream of the association. In one embodiment, a technique of managing the amount of traffic having a particular priority is used to provide a quality of service target for one or more types of traffic. In one embodiment, traffic is marked as belonging to a certain class. In another embodiment, traffic may be marked based on a perceived consumption and/or an availability of resources or the like.

3.5 Process of Providing Routing Topologies in BGP Traffic

An approach for providing plural routing topologies for a network is now described with reference to FIG. 3B and FIG. 2E. FIG. 3B is a functional diagram that illustrates operation of SCTP routing topologies in one embodiment; FIG. 2E is a flow diagram that illustrates a high level overview of providing plural routing topologies operable with the processing depicted by FIG. 2A in one embodiment.

Referring to FIG. 3B, assume that routers 110A and 110B have established an SCTP association. The SCTP association includes a number of individual streams, which are being used by routers 110A and 110B to exchange communications packets. In one embodiment, routers 110A and 110B can route the BGP update traffic using different SCTP streams along different routes depending on the class of service assigned to the traffic. This may be achieved in one embodiment by setting the class of service information in the IP packets so that the forwarding function of routers 110A, 110B and any other intermediary routers (not shown) treating the traffic in accordance with the routing information in the packets. Accordingly, in specific embodiments, the traffic can be segregated into different streams, each of which routes traffic through a different routing path, such as via intermediate nodes 120A, 120B in FIG. 3B, based upon the traffic classification.

Again referring to FIG. 3B, a first type of traffic that has been assigned to a first stream is sent via node 120A using the first stream of the association. A second type of traffic has been assigned to a second stream and is sent via node 120B using the second stream of the association. Alternative embodiments may use different numbers of streams in the association and may segregate the traffic using a variety of routing topologies.

Figure 2E:
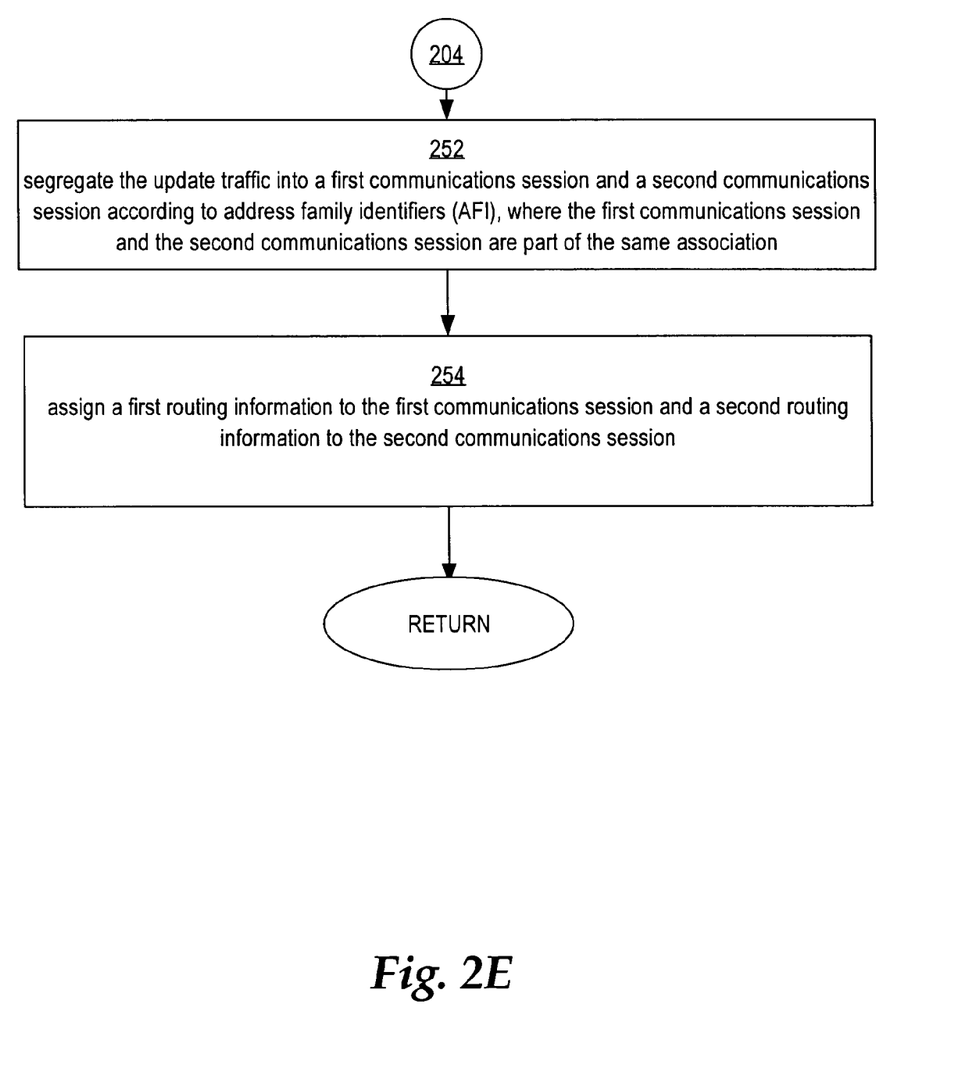
FIG. 2E is a flow diagram that illustrates a high level overview of providing plural routing topologies operable with the processing depicted by FIG. 2A in one embodiment.
Figure 3B:
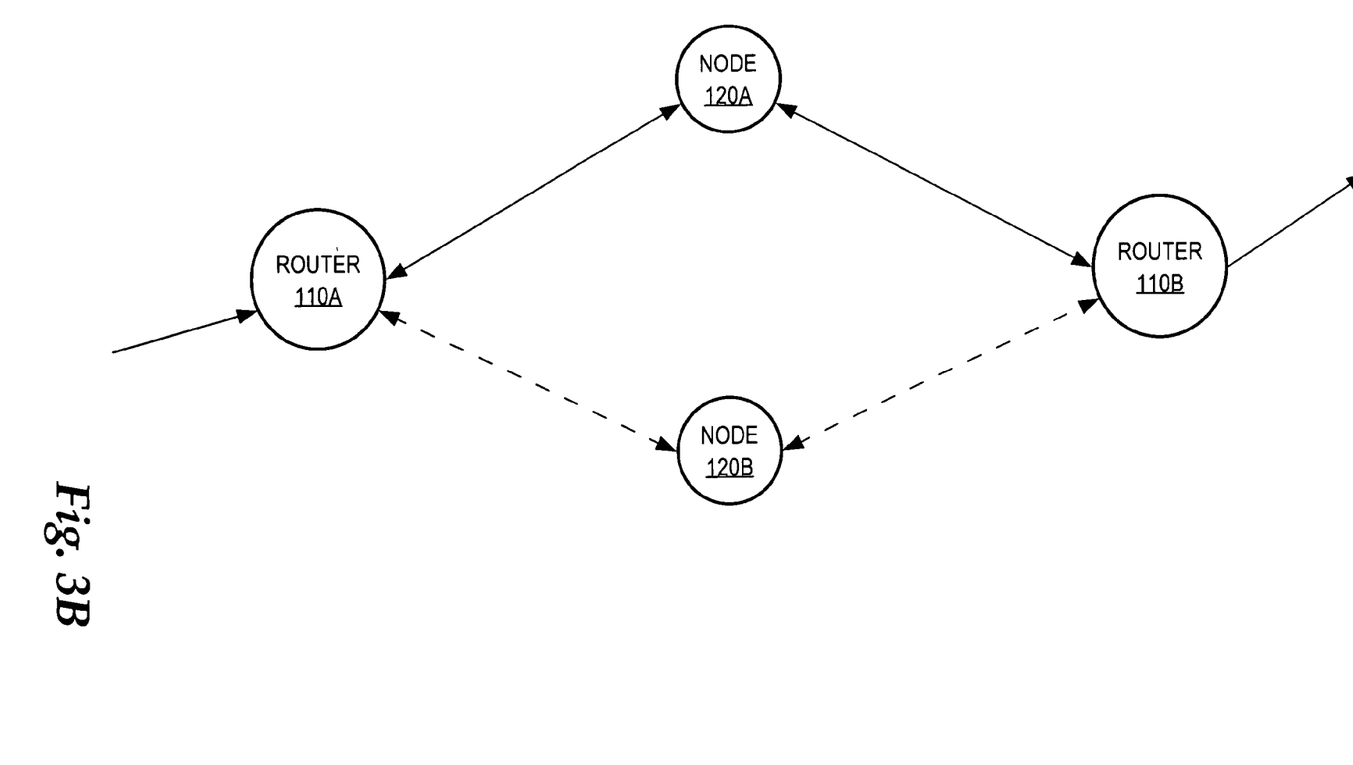
FIG. 3B is a functional diagram that illustrates operation of SCTP routing topologies in one embodiment.

Now referring to FIG. 2E, in block 252, the update traffic is segregated into a first communications session and a second communications session according to address family identifiers (AFI). The first communications session and the second communications session are part of the same association. In block 254, a first routing information is assigned to the first communications session and a second routing information is assigned to the second communications session. As a result, a BGP session can carry two or more sets of routing information, each set of routing information pointing to a different next hop, in different SCTP streams.

4.0 Implementation Mechanisms—Hardware Overview

Figure 4:
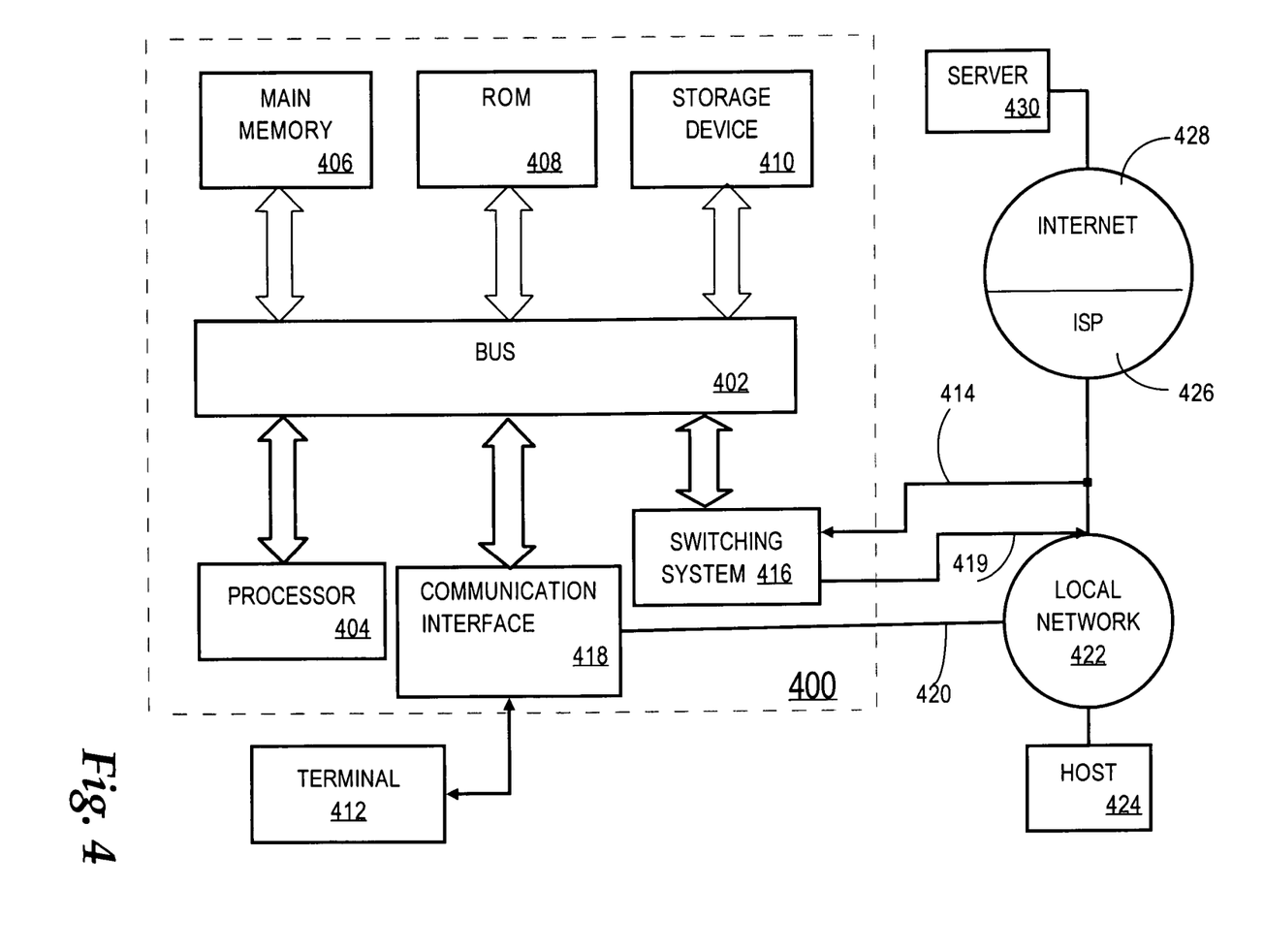
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for providing QoS and fault isolation in BGP traffic, address families and routing topologies. According to one embodiment of the invention, providing QoS and fault isolation in BGP traffic, address families and routing topologies are provided by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for QoS and fault isolation in BGP traffic, address families and routing topologies as described herein.

The received code may be executed by processor 404 as it is received, and/or stored in storage device 410, or other non-volatile storage for later execution. In this manner, computer system 400 may obtain application code.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of routing Border Gateway Protocol (BGP) traffic, the method comprising the computer-implemented steps of: forming an association between a first process, comprising a first BGP process on a first peer and a second process, comprising a second BGP process on a second peer, using a reliable datagram-oriented IP transport protocol; segregating traffic sent from the first BGP process, into a control traffic type and an update traffic type; assigning a first priority to packets containing control traffic type information and assigning a second priority to packets containing update traffic type information; managing communication of traffic having a first priority so that a delay for control traffic type sent to the second process is sufficiently small to prevent the second BGP process from failing for lack of control information; and sending the traffic from the first BGP process to the second BGP process in accordance with a priority allocation assigned to the traffic types using the association.

2. A method as recited in claim 1, wherein the step of segregating traffic from the first process by traffic type further comprises the steps of:
   determining an IP type of service identifier of the traffic; and
   packaging traffic into common packets based upon the IP type of service identifier.

3. A method as recited in claim 1, further comprising the step of:
   segregating the update traffic into a first communications session and a second communications session according to address family identifiers (AFI) and subsequent address family identifiers (SAFI).

4. A method as recited in claim 1, wherein forming an association comprises:
   forming a Stream Control Transmission Protocol (SCTP) association between the first process and the second process.

5. A method as recited in claim 1, further comprising the step of: segregating the update traffic into a first communications session and a second communications session according to address family identifiers (AFI), wherein the first communications session and the second communications session comprise the same association.

6. A method as recited in claim 4, wherein sending the traffic from the first BGP process to the second BGP process comprises: sending the traffic assigned the first priority to the second BGP process on a first stream of the association and the traffic assigned the second priority to the second BGP process on a second stream of the association.

7. A method as recited in claim 5, the method further comprising the steps of:
   closing the first communication session, when an error occurs with the first communication session for a first AFI; and
   maintaining the second communications session.

8. A method as recited in claim 5, wherein sending the traffic from the first BGP process to the second BGP process in accordance with a priority allocation assigned to the traffic type using the association comprises:
   assigning a higher priority to packets containing traffic of the first communications session and assigning a lower priority to packets containing traffic of the second communications session.

9. A method as recited in claim 5, wherein sending the traffic from the first BGP process to the second BGP process in accordance with a priority allocation assigned to the traffic type using the association comprises:
   assigning a higher priority to packets containing traffic of the first communications session and assigning a lower priority to packets containing traffic of the second communications session; and
   sending the traffic assigned the higher priority to the second BGP process on a first stream of the association and the traffic assigned the lower priority to the second BGP process on a second stream of the association.

10. A method as recited in claim 8, further comprising the steps of:
    managing the amount of traffic having the higher priority so that traffic of the first communications session is routed in accordance with a target QoS.

11. A method as recited in claim 8, further comprising the steps of:
    assigning a first routing information to the first communications session and a second routing information to the second communications session; thereby enabling a first application using the first communications session to use a first routing topology and a second application using the second communications session to use a second routing topology, wherein the first routing topology is different from the second routing topology.

12. A method of routing Border Gateway Protocol (BGP) traffic, the method comprising the computer-implemented steps of:
    forming an Stream Control Transmission Protocol (SCTP) association between a first process, comprising a first BGP process on a first peer and a second process, comprising a second BGP process on a second peer;
    segregating traffic sent from the first BGP process, into a control traffic type and an update traffic type;
    assigning a first priority to packets containing control traffic type information and assigning a second priority to packets containing update traffic type information; and
    sending the traffic assigned the first priority to the second BGP process on a first stream of the association and the traffic assigned the second priority to the second BGP process on a second stream of the association.

13. A method as recited in claim 12, further comprising the step of:
    segregating the update traffic into a first communications session and a second communications session according to address family identifiers (AFI), wherein the first communications session and the second communications session comprise the same association;
    assigning the second priority to packets containing update traffic for the first communications session and a third priority to packets containing update traffic for the second communications session; and
    sending the traffic assigned the first priority on a first stream of the association and the traffic assigned the second priority on a second stream of the association and the traffic assigned the third priority on a third stream of the association;
    thereby enabling an amount of traffic having the first priority, second priority and third priority to be managed so that traffic of at least one communications session is routed in accordance to a target QoS.

14. A method as recited in claim 13, further comprising the steps of:
    assigning a first routing information to the first communications session and a second routing information to the second communications session;
    thereby enabling a first application using the first communications session to use a first routing topology and a second application using the second communications session to use a second routing topology, wherein the first routing topology is different from the second routing topology.

15. A machine-readable storage medium storing one or more sequences of instructions for routing Border Gateway Protocol (BGP) traffic, which instructions, when executed by one or more processors, cause the one or more processors to carry out the steps of:
    forming an association between a first process, comprising a first BGP process on a first peer and a second process, comprising a second BGP process on a second peer, using a reliable datagram-oriented IP transport protocol;
    segregating traffic sent from the first BGP process, into a control traffic type and an update traffic type;
    assigning a first priority to packets containing control traffic type information and assigning a second priority to packets containing update traffic type information;
    managing communication of traffic having a first priority so that a delay for control traffic type sent to the second process is sufficiently small to prevent the second BGP process from failing for lack of control information; and
    sending the traffic from the first BGP process to the second BGP process in accordance with a priority allocation assigned to the traffic types using the association.

16. A machine-readable storage medium as recited in claim 15, wherein the instructions for carrying out the step of segregating traffic from the first process by traffic type further comprise instructions for carrying out the steps of:
    determining an IP type of service identifier of the traffic; and
    packaging traffic into common packets based upon the IP type of service identifier.

17. A machine-readable storage medium as recited in claim 15, further comprising instructions which, when executed by the one or more processors, cause the one or more processors to carry out the step of:
    segregating the update traffic into a first communications session and a second communications session according to address family identifiers (AFI) and subsequent address family identifiers (SAFI).

18. A machine-readable storage medium as recited in claim 15, wherein the instructions for carrying out the step of forming an association comprise instructions for carrying out the step of:

forming a Stream Control Transmission Protocol (SCTP) association between the first process and the second process.

19. A machine-readable storage medium as recited in claim 15, wherein the instructions for carrying out the step of segregating traffic from the first process by traffic type further comprise instructions for segregating the update traffic into a first communications session and a second communications session according to address family identifiers (AFI), wherein the first communications session and the second communications session comprise the same association.

20. A machine-readable storage medium as recited in claim 18, wherein the instructions for carrying out the step of sending the traffic from the first BGP process to the second BGP process comprise instructions for carrying out the step of: sending the traffic assigned the first priority to the second BGP process on a first stream of the association and the traffic assigned the second priority to the second BGP process on a second stream of the association.

21. A machine-readable storage medium as recited in claim 19, further comprising instructions which, when executed by the one or more processors, cause the one or more processors to carry out the steps of:

closing the first communication session, when an error occurs with the first communication session for a first AFI; and maintaining the second communications session.

22. A machine-readable storage medium as recited in claim 19, wherein the instructions for carrying out the step of sending the traffic from the first BGP process to the second BGP process in accordance with a priority allocation assigned to the traffic type using the association comprise instructions for carrying out the step of:

assigning a higher priority to packets containing traffic of the first communications session and assigning a lower priority to packets containing traffic of the second communications session.

23. A machine-readable storage medium as recited in claim 19, wherein the instructions for carrying out the step of sending the traffic from the first BGP process to the second BGP process in accordance with a priority allocation assigned to the traffic type using the association comprise instructions for carrying out the steps of:

assigning a higher priority to packets containing traffic of the first communications session and assigning a lower priority to packets containing traffic of the second communications session; and sending the traffic assigned the higher priority to the second BGP process on a first stream of the association and the traffic assigned the lower priority to the second BGP process on a second stream of the association.

24. A machine-readable storage medium as recited in claim 22, further comprising instructions which, when executed by the one or more processors, cause the one or more processors to carry out the step of:

managing the amount of traffic having the higher priority so that traffic of the first communications session is routed in accordance to a target QoS.

25. A machine-readable storage medium as recited in claim 22, further comprising instructions which, when executed by the one or more processors, cause the one or more processors to carry out the step of:

assigning a first routing information to the first communications session and a second routing information to the second communications session; thereby enabling a first application using the first communications session to use a first routing topology and a second application using the second communications session to use a second routing topology, wherein the first routing topology is different from the second routing topology.

26. A machine-readable storage medium storing one or more sequences of instructions for routing Border Gateway Protocol (BGP) traffic, which instructions, when executed by one or more processors, cause the one or more processors to carry out the steps of:

forming an Stream Control Transmission Protocol (SCTP) association between a first process, comprising a first BGP process on a first peer and a second process, comprising a second BGP process on a second peer;

segregating traffic sent from the first BGP process, into a control traffic type and an update traffic type;

assigning a first priority to packets containing control traffic type information and assigning a second priority to packets containing update traffic type information; and sending the traffic assigned the first priority to the second BGP process on a first stream of the association and the traffic assigned the second priority to the second BGP process on a second stream of the association.

27. A machine-readable storage medium as recited in claim 26, further comprising instructions which, when executed by the one or more processors, cause the one or more processors to carry out the steps of:

segregating the update traffic into a first communications session and a second communications session according to address family identifiers (AFI), wherein the first communications session and the second communications session comprise the same association;

assigning the second priority to packets containing update traffic for the first communications session and a third priority to packets containing update traffic for the second communications session; and sending the traffic assigned the first priority on a first stream of the association and the traffic assigned the second priority on a second stream of the association and the traffic assigned the third priority on a third stream of the association;

thereby enabling an amount of traffic having the first priority, second priority and third priority to be managed so that traffic of at least one communications session is routed in accordance to a target QoS.

28. A machine-readable storage medium as recited in claim 27, further comprising instructions which, when executed by the one or more processors, cause the one or more processors to carry out the steps of:

assigning a first routing information to the first communications session and a second routing information to the second communications session;

thereby enabling a first application using the first communications session to use a first routing topology and a second application using the second communications session to use a second routing topology, wherein the first routing topology is different from the second routing topology.

29. An apparatus for routing Border Gateway Protocol (BGP) traffic, comprising: means for forming an association between a first process, comprising a first BGP process on a first peer and a second process, comprising a second BGP process on a second peer, using a reliable datagram-oriented IP transport protocol; means for segregating traffic sent from the first BGP process, into a control traffic type and an update traffic type; means for assigning a first priority to packets containing control traffic type information and assigning a second priority to packets containing update traffic type information; means for managing communication of traffic having a first priority so that a delay for control traffic type sent to the second process is sufficiently small to prevent the second BGP process from failing for lack of control information; means for sending the traffic from the first BGP process to the second BGP process in accordance with a priority allocation assigned to the traffic types using the association.

30. An apparatus for routing Border Gateway Protocol (BGP) traffic, comprising:
   means for forming an Stream Control Transmission Protocol (SCTP) association between a first process, comprising a first BGP process on a first peer and a second process, comprising a second BGP process on a second peer;
   means for segregating traffic sent from the first BGP process, into a control traffic type and an update traffic type;
   means for assigning a first priority to packets containing control traffic type information and assigning a second priority to packets containing update traffic type information; and
   means for sending the traffic assigned the first priority to the second BGP process on a first stream of the association and the traffic assigned the second priority to the second BGP process on a second stream of the association.

31. An apparatus for routing Border Gateway Protocol (BGP) traffic, comprising: a memory; a processor, coupled to the memory by a bus; and one or more stored sequences of instructions which, when executed by the processor, cause the processor to carry out the steps of: forming an association between a first process, comprising a first BGP process on a first peer and a second process, comprising a second BGP process on a second peer, using a reliable datagram-oriented IP transport protocol; segregating traffic sent from the first BGP process, into a control traffic type and an update traffic type; assigning a first priority to packets containing control traffic type information and assigning a second priority to packets containing update traffic type information; managing communication of traffic having a first priority so that a delay for control traffic type sent to the second process is sufficiently small to prevent the second BGP process from failing for lack of control information; and sending the traffic from the first BGP process to the second BGP process in accordance with a priority allocation assigned to the traffic types using the association.

32. An apparatus as recited in claim 31, wherein the instructions for carrying out the step of segregating traffic from the first process by traffic type further comprise instructions for carrying out the steps of:
   determining an IP type of service identifier of the traffic; and
   packaging traffic into common packets based upon the IP type of service identifier.

33. An apparatus as recited in claim 31, further comprising instructions which, when executed by the one or more processors, cause the one or more processors to carry out the step of:
   segregating the update traffic into a first communications session and a second communications session according to address family identifiers (AFI) and subsequent address family identifiers (SAFI).

34. An apparatus as recited in claim 31, wherein the instructions for carrying out the step of forming an association comprise instructions for carrying out the step of:
   forming a Stream Control Transmission Protocol (SCTP) association between the first process and the second process.

35. An apparatus as recited in claim 34, wherein the instructions for carrying out the step of sending the traffic from the first BGP process to the second BGP process comprise instructions for carrying out the step of: sending the traffic assigned the first priority to the second BGP process on a first stream of the association and the traffic assigned the second priority to the second BGP process on a second stream of the association.

36. An apparatus as recited in claim 31, further comprising instructions which, when executed by the one or more processors, cause the one or more processors to carry out the step of: segregating the update traffic into a first communications session and a second communications session according to address family identifiers (AFI), wherein the first communications session and the second communications session comprise the same association.

37. An apparatus as recited in claim 36, further comprising instructions which, when executed by the one or more processors, cause the one or more processors to carry out the steps of:
   closing the first communication session, when an error occurs with the first communication session for a first AFI; and
   maintaining the second communications session.

38. An apparatus as recited in claim 36, wherein the instructions for carrying out the step of sending the traffic from the first BGP process to the second BGP process in accordance with a priority allocation assigned to the traffic type using the association comprise instructions for carrying out the step of:
   assigning a higher priority to packets containing traffic of the first communications session and assigning a lower priority to packets containing traffic of the second communications session.

39. An apparatus as recited in claim 36, wherein the instructions for carrying out the step of sending the traffic from the first BGP process to the second BGP process in accordance with a priority allocation assigned to the traffic type using the association comprise instructions for carrying out the steps of:
   assigning a higher priority to packets containing traffic of the first communications session and assigning a lower priority to packets containing traffic of the second communications session; and
   sending the traffic assigned the higher priority to the second BGP process on a first stream of the association and the traffic assigned the lower priority to the second BGP process on a second stream of the association.

40. An apparatus as recited in claim 38, further comprising instructions which, when executed by the one or more processors, cause the one or more processors to carry out the step of:
   managing the amount of traffic having the higher priority so that traffic of the first communications session is routed in accordance to a target QoS.

41. An apparatus as recited in claim 38, further comprising instructions which, when executed by the one or more processors, cause the one or more processors to carry out the step of:
   assigning a first routing information to the first communications session and a second routing information to the second communications session; thereby enabling a first application using the first communications session to use a first routing topology and a second application using the second communications session to use a second routing topology, wherein the first routing topology is different from the second routing topology.

42. An apparatus for routing Border Gateway Protocol (BGP) traffic, comprising:

a memory;

a processor, coupled to the memory by a bus; and one or more stored sequences of instructions which, when executed by the processor, cause the processor to carry out the steps of:

forming an Stream Control Transmission Protocol (SCTP) association between a first process, comprising a first BGP process on a first peer and a second process, comprising a second BGP process on a second peer;

segregating traffic sent from the first BGP process, into a control traffic type and an update traffic type;

assigning a first priority to packets containing control traffic type information and assigning a second priority to packets containing update traffic type information; and sending the traffic assigned the first priority to the second BGP process on a first stream of the association and the traffic assigned the second priority to the second BGP process on a second stream of the association.

43. An apparatus as recited in claim 42, further comprising instructions which, when executed by the one or more processors, cause the one or more processors to carry out the steps of:

segregating the update traffic into a first communications session and a second communications session according to address family identifiers (AFI), wherein the first communications session and the second communications session comprise the same association;

assigning the second priority to packets containing update traffic for the first communications session and a third priority to packets containing update traffic for the second communications session; and sending the traffic assigned the first priority on a first stream of the association and the traffic assigned the second priority on a second stream of the association and the traffic assigned the third priority on a third stream of the association;

thereby enabling an amount of traffic having the first priority, second priority and third priority to be managed so that traffic of at least one communications session is routed in accordance to a target QoS.

44. An apparatus as recited in claim 43, further comprising instructions which, when executed by the one or more processors, cause the one or more processors to carry out the steps of:

assigning a first routing information to the first communications session and a second routing information to the second communications session;

thereby enabling a first application using the first communications session to use a first routing topology and a second application using the second communications session to use a second routing topology, wherein the first routing topology is different from the second routing topology.

\* \* \* \* \*